United States Patent [19]

Roth, Jr. et al.

[11] Patent Number: 5,648,435
[45] Date of Patent: *Jul. 15, 1997

[54] PROCESS FOR PRODUCTION OF MULTICYANATE ESTERS

[75] Inventors: David W. H. Roth, Jr., Southern Shore, N.C.; Sajal Das, Basking Ridge, N.J.

[73] Assignee: AlliedSignal Inc., Morristown, N.J.

[*] Notice: The term of this patent shall not extend beyond the expiration date of Pat. No. 5,483,013.

[21] Appl. No.: 558,218

[22] Filed: Nov. 17, 1995

Related U.S. Application Data

[63] Continuation-in-part of Ser. No. 379,233, Jan. 27, 1995, Pat. No. 5,483,013, and Ser. No. 488,467, Jun. 7, 1995, Pat. No. 5,504,186, which is a division of Ser. No. 379,233.

[51] Int. Cl.$^6$ .......................... C08F 283/00; C08G 8/28; C08L 61/00
[52] U.S. Cl. .......................... 525/480; 525/499; 525/501; 525/502; 525/504; 525/509; 524/755; 524/758; 528/232; 528/247; 528/267; 210/767; 210/772; 210/904; 210/908
[58] Field of Search .......................... 525/480, 499, 525/504, 501, 509, 502; 524/755, 758; 528/232, 247, 267; 210/767, 772, 904, 908

[56] References Cited

U.S. PATENT DOCUMENTS

| | | | |
|---|---|---|---|
| 3,338,965 | 3/1965 | Belden et al. | 564/259 |
| 3,966,670 | 6/1976 | Grazen et al. | 523/149 |
| 4,022,755 | 5/1977 | Tanigaichi et al. | 525/504 |
| 4,069,108 | 1/1978 | Riecker | 202/263 |
| 4,218,361 | 8/1980 | Searfoss et al. | 524/291 |
| 4,219,452 | 8/1980 | Littlefield | 523/149 |
| 4,268,157 | 5/1981 | Egi et al. | 355/3 TR |
| 4,268,657 | 5/1981 | Manzara | 528/155 |
| 4,831,086 | 5/1989 | Das et al. | 528/155 |
| 4,970,276 | 11/1990 | Das et al. | 525/504 |
| 4,978,727 | 12/1990 | Das et al. | 525/504 |
| 5,124,414 | 6/1992 | Sajal et al. | 525/504 |
| 5,126,412 | 6/1992 | Das et al. | 525/504 |
| 5,137,989 | 8/1992 | Das et al. | 525/504 |
| 5,264,500 | 11/1993 | Green et al. | 525/480 |
| 5,329,061 | 7/1994 | Swift | 585/805 |

FOREIGN PATENT DOCUMENTS

| | | |
|---|---|---|
| 19519102 | 11/1995 | Germany. |
| 58-34822 | 3/1983 | Japan. |
| 59-149918 | 8/1984 | Japan. |

OTHER PUBLICATIONS

Patent Abstracts of Japan, English–language abstract of Japanese Published Patent Application No. 58–34822; Inventor: Doutani Masaharu et al.

Patent Abstracts of Japan, English–language abstract of Japanese Published Patent Application No. 59–149918; Inventor: Doutani Masaharu et al.

(List continued on next page.)

*Primary Examiner*—Samuel A. Acquah
*Attorney, Agent, or Firm*—Fisher, Christen & Sabol

[57] ABSTRACT

A process of preparing multicyanate esters by: a) reacting an adduct of a tertiary amine and a phenol-formaldehyde oligomer or derivative thereof with cyanogen halide in a solvent reaction medium under conditions to form a reaction product stream containing at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester; b) recycling a portion of said reaction product stream into the mixture of step a; and c) separating and recovering said solvent and tertiary amine from said reaction product stream. The multicyanate ester products produced are useful as bonding agents in friction materials, molding materials, coatings, and adhesives.

20 Claims, 2 Drawing Sheets

OTHER PUBLICATIONS

Chang, et al. "Development of an Azeotropic Distillation Scheme for Purification of Tetrahydrofuran", Fluid Phase Equilibria, vol. 52, (1989), pp. 161–168.

DuPont, "Recovery of THF DuPont Tetrahydrofuran", pp. 1–16 (1984).

Octave Levenspiel, "Chemical Reaction Engineering", John Wiley & Sons, Inc., Second Edition, pp. 93–149 (2nd Ed. 1962).

Perry and Chilton, Chemical Engineers' Handbook, 13-37, 13-39; 11-40; 18-20; 18-5;18-19; 11-39; 8-54; 6-13; 8-61; 10-34; 19-77; 19-78; 19-80; 19-81; 19-47; 21-7; 21-13; 21-14; 21-19; 21-24; 21-26; (5th ed. 1973).

PROCESS FOR PRODUCTION OF MULTICYANATE ESTERS

This application is a continuation-in-part of U.S. Ser. No. 08/379,233, filed on Jan. 27, 1995 now U.S. Pat. No. 5,483,013, and is a continuation-in-part of U.S. Ser. No. 08/488,467, filed on Jun. 7, 1995 now U.S. Pat. No. 5,504,186, which is a divisional of the first mentioned application.

BACKGROUND OF THE INVENTION

1. Field of the Invention

This invention relates to a process for preparing multicyanate esters. More particularly, this invention relates to a continuous or semi-batch process for producing multicyanate esters.

As used herein, the term "multicyanate esters" shall mean an oligomeric mixture of esters having greater than two cyanate groups attached thereto. Illustrative of such mixtures of esters are phenol-formaldehyde resins and derivatives thereof including, but not limited to, cresol-type resins and novolac-type resins which can be substituted with at least one inert substinent, such as halogen, trihalomethyl, alkyl, alkoxy, phenyl and the like, wherein the novolac-type resins are in either the solid or liquid form.

2. Description of the Prior Art

Phenolic resins are a class of synthetic materials that have grown continuously in terms of volume and applications for over several decades. Phenolic resins are often used as bonding agents in friction materials such as brake linings, clutch facings, transmission bonds, and the like. See, e.g., U.S. Pat. Nos. 4,268,157; 4,069,108; 4,268,657; 4,218,361; 4,219,452; and 3,966,670. Phenolics are also used as molding materials, coatings, and adhesives. Phenolic resins developed for non-flammability and long-term temperature stability to 230° C. have been studied in carbon-fiber composites. Potential for such composites lies in advanced aircraft applications.

While present day phenolics exhibit several beneficial properties, they also suffer from a number of disadvantages, such as thermal oxidative instability, which restricts their utility. Although the modification of phenolics with cyanato groups has obviated this disadvantage, such modified phenolics have not been commercially produced because of poor shelf life, and a gel time too short for processing using known continuous processing methods for polymers and/or chemicals. This is because smoke and volatile chemicals are generated as the phenolic cyanate ester resins are cured, and the resulting crosslinked phenolic-triazine products ("PT resins") therefrom are unstable and possess poor mechanical properties, i.e., brittle.

U.S. Pat. No. 4,831,086 discloses a new class of phenolic cyanates and a method for their production whereby a phenolic resin and a base are reacted in a cyclic ether solvent to form the corresponding salt at room temperature. The salt is then reacted with a cyanogen halide in a cyclic ether at temperatures preferably between −15° and −30° C. in order to increase the yield and stability of the PT resins produced therefrom by minimizing the production of side reaction impurities, such as diethylcyanamide $(C_2H_5)_2NCN$, imidocarbonate Ar—O—C(NH)—O—Ar' wherein Ar and Ar' are any aromatic radicals such as phenyl, and alkyl halide $(C_2H_5)X$ wherein X is bromine or chlorine. See also U.S. Pat. Nos. 5,124,414 and 5,137,989. However, this process is time-consuming since the reactants are combined slowly in order to minimize the presence of such impurities. In addition, in view of the fact that the reaction of salt with cyanogen halide is nearly instantaneous and highly exothermic, the reaction mass temperature increases markedly and cannot be effectively cooled by conventional cooling means. Operating at such high temperatures leads to an increase in the frequency of side reactions, the production of partially cyanated end products and the consumption of amine and cyanogen halide. By precooling the reactants to very low temperatures, i.e., below −45° C., the rate of reaction, and thus the amount of exothermic energy released therefrom, can be reduced. Although the precooling reduces the amount of exothermic energy to a level which can be removed by conventional cooling means, operating as such is neither cost-effective nor energy-efficient. It is also known that as a result of the insufficient mixing of the reactants during the slow process described above, the presence of concentration and/or temperature gradients, and thus the formation of side products, increases.

It would be desirable to provide a rapid, energy-efficient process for the continuous or semi-batch production of multicyanate esters having improved stability and gel time. More specifically, it would be desirable to provide such a process which not only minimizes side reactions, but also is capable of operating at temperatures close to ambient as well as providing sufficient mixing of the reactants so as to selectively promote the primary reactions.

SUMMARY OF THE INVENTION

In accordance with this invention, there is provided a process for producing multicyanate esters comprising:

a) feeding to a reaction vessel a first feed stream comprising a reaction medium comprising a solvent, and adduct of a tertiary amine and a phenol-formaldehyde oligomer or derivative thereof of the formula:

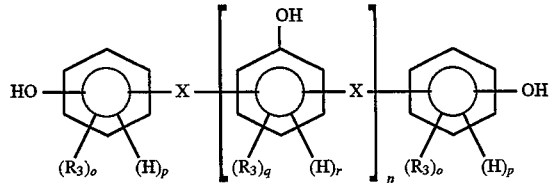

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer;

b) feeding to said reaction vessel a second feedstream comprising a cyanogen halide in a reaction medium comprising a solvent;

c) feeding to said reaction vessel a recycle stream comprising at least one of the following compounds selected from the group consisting of tertiary amine-hydrohalide salt, solvent, impurities, multicyanate ester and mixtures thereof;

d) reacting said first, second, and recycle streams in said reaction vessel under conditions sufficient to form a reaction product stream comprising at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester; and e) removing a portion of said reaction product stream to produce said recycle stream such that the volume ratio of said recycle stream to said product stream is from about 100:1 to about 25:1.

Another aspect of this invention is directed to a process for the extraction and recovery of a multicyanate ester from a mixed multicyanate ester feed stock comprising a multicyanate ester and at least one of the following compounds selected from the group consisting of by-products, solvent, and impurities, comprising:

a) quenching said feed stock with a water stream to produce an organic phase stream comprising said multicyanate ester and an aqueous phase stream;

b) separating said organic phase stream comprising said multicyanate ester from said aqueous phase stream; and c) washing said organic phase stream with water to further remove said by-products and impurities from said multicyanate ester.

Another aspect of this invention is directed to a process for the extraction and recovery of water miscible solvents from a mixed aqueous feed stock comprising at least one of the components selected from the group consisting of tertiary amine hydrohalide salt, water, and impurities including diethyl cyanamide, cyanogen halide, and alkyl halide, comprising:

introducing said mixed aqueous feed stock into the top quarter of a distillation column operating at conditions sufficient to produce an overhead product stream comprising, based upon the total weight of said overhead product stream, about at least 95 weight percent water miscible solvent which is substantially free of trialkylamine hydrohalide salt and impurities.

Another aspect of this invention is directed to a process for the extraction and recovery of tertiary amine from a mixed aqueous feed stock comprising at least one of the components selected from the group consisting of tertiary amine, solvent, alkaline halide, water, impurities further comprising diethyl cyanamide, cyanogen halide, and alkyl halide, and mixtures thereof comprising:

introducing said mixed aqueous feed stock into the top quarter of a distillation column operating at conditions sufficient to produce an overhead product stream comprising, based upon the total weight of said overhead product stream, about at least 95 weight percent of tertiary amine which is substantially free of water and impurities.

Another aspect of this invention is directed to process for producing multicyanate esters comprising:

a) feeding to a reaction vessel a first feed stream comprising a reaction medium comprising a solvent, and an adduct of a tertiary amine and a phenol-formaldehyde oligomer or derivative thereof of the formula:

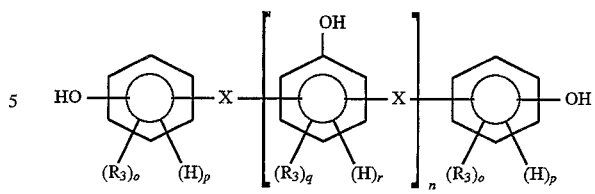

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer;

b) feeding to said reaction vessel a second feed stream comprising a cyanogen halide in a reaction medium comprising a solvent;

c) feeding to said reaction vessel a recycle stream comprising at least one of the following compounds selected from the group consisting of tertiary amine-hydrohalide salt, solvent, impurities, multicyanate ester and mixtures thereof;

d) reacting said first, second, and recycle streams in said reaction vessel under conditions sufficient to form a reaction product stream comprising at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester;

e) removing a portion of said reaction product stream to produce said recycle stream such that the volume ratio of said recycle stream to said product stream is about 100:1 to about 25:1;

f) introducing said reaction product stream to a salt isolation and washing zone to separate said reaction product stream into an organic stream and an aqueous stream, said organic stream comprising said multicyanate ester and at least one of the following components selected from the group consisting of water, solvent, impurities, and mixtures thereof, and said aqueous stream comprising said tertiary amine hydrohalide salt and at least one of the following components selected from the group consisting of water, solvent, impurities, and mixtures thereof;

g) introducing said organic stream into a devolatilization zone to separate said organic stream into a multicyanate ester stream and a devolatilization zone solvent stream;

h) introducing said devolatilization zone solvent stream and said aqueous stream from said salt isolation and washing zone into a solvent recovery zone to form a solvent recovery zone mixture;

i) in said solvent recovery zone, separating said solvent recovery zone mixture into a solvent recovery zone overhead solvent stream and a solvent recovery zone bottoms stream comprising at least one of the components selected from the group consisting of tertiary amine hydrohalide salt, water, dicyanamide, cyanogen halide, and other organics;

j) introducing said solvent recovery zone bottoms stream and a basic solution stream into a tertiary amine recovery zone to form a tertiary amine recovery zone mixture; and k) in said tertiary amine recovery zone, separating said tertiary amine from said tertiary amine recovery zone mixture.

Another aspect of this invention is directed to process for producing multicyanate esters comprising:

a) feeding to a reaction vessel a first feed stream comprising a reaction medium comprising a solvent, and an adduct of a tertiary amine and a phenol-formaldehyde oligomer or derivative thereof of the formula:

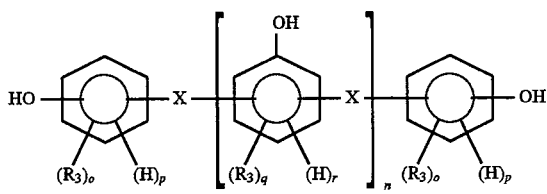

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer;

b) feeding to said reaction vessel a second feed stream comprising a cyanogen halide in a reaction medium comprising a solvent;

c) feeding to said reaction vessel a recycle stream comprising at least one of the following compounds selected from the group consisting of tertiary amine-hydrohalide salt, solvent, impurities, multicyanate ester and mixtures thereof;

d) reacting said first, second, and recycle streams in said reaction vessel under conditions sufficient to form a reaction product stream comprising at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester;

e) removing a portion of said reaction product stream to produce said recycle stream such that the volume ratio of said recycle stream to said product stream is about 1:100 to about 1:25;

f) introducing said reaction product stream to a salt isolation and washing zone to separate said reaction product stream into an organic stream and an aqueous stream, said organic stream comprising said multicyanate ester and at least one of the following components selected from the group consisting of water, solvent, by-products, and mixtures thereof, and said aqueous stream comprising said tertiary amine hydrohalide salt and at least one of the following components selected from the group consisting of water, solvent, impurities, and mixtures thereof;

g) introducing said organic stream into a devolatilization zone to separate said organic stream into a multicyanate ester stream and a devolatilization zone solvent stream;

h) introducing said devolatilization zone solvent stream, said aqueous stream from said salt isolation and washing zone and a stream containing a basic solution into a tertiary amine recovery zone to form a tertiary amine recovery zone mixture; and i) in said tertiary amine recovery zone, separating said tertiary amine from said tertiary amine recovery zone mixture.

Because the process of this invention is carried out in either a semi-batch reactor wherein each component is added thereto at a rate compatible with the cooling means, or in a continuous back mixed stirred tank reactor wherein the precooled reaction mass moderates the reaction mass temperature rise after the reactants are injected thereto, the amount of exothermic energy released during the reaction is reduced to a level which can be efficiently removed by conventional cooling means, and the increase in temperature of the reaction mass is minimized. Both the efficient removal of exothermic energy from the reactor as well as the intensive mixing achieved therein also contribute to the improved stability and gel time of the multicyanate esters produced therefrom.

BRIEF DESCRIPTION OF THE DRAWINGS

The invention will be more fully understood and further advantages will become apparent when reference is made to the following detailed description of the invention and the accompanying drawings in which.

DESCRIPTION OF THE PREFERRED EMBODIMENTS

Where applicable, reference will be made to either FIG. 1 or FIG. 2, each of which represents one embodiment of the overall continuous or semi-batch process of the present invention. Unless expressly provided otherwise, all references herein shall be in terms of weight. All feed streams described herein may be introduced into the subsequent respective vessel or zone continuously or intermittently during the course of the process. In addition, the process of this invention employs conventional means for introducing, discharging, and/or adjusting the quantity of streams.

Figure 1:
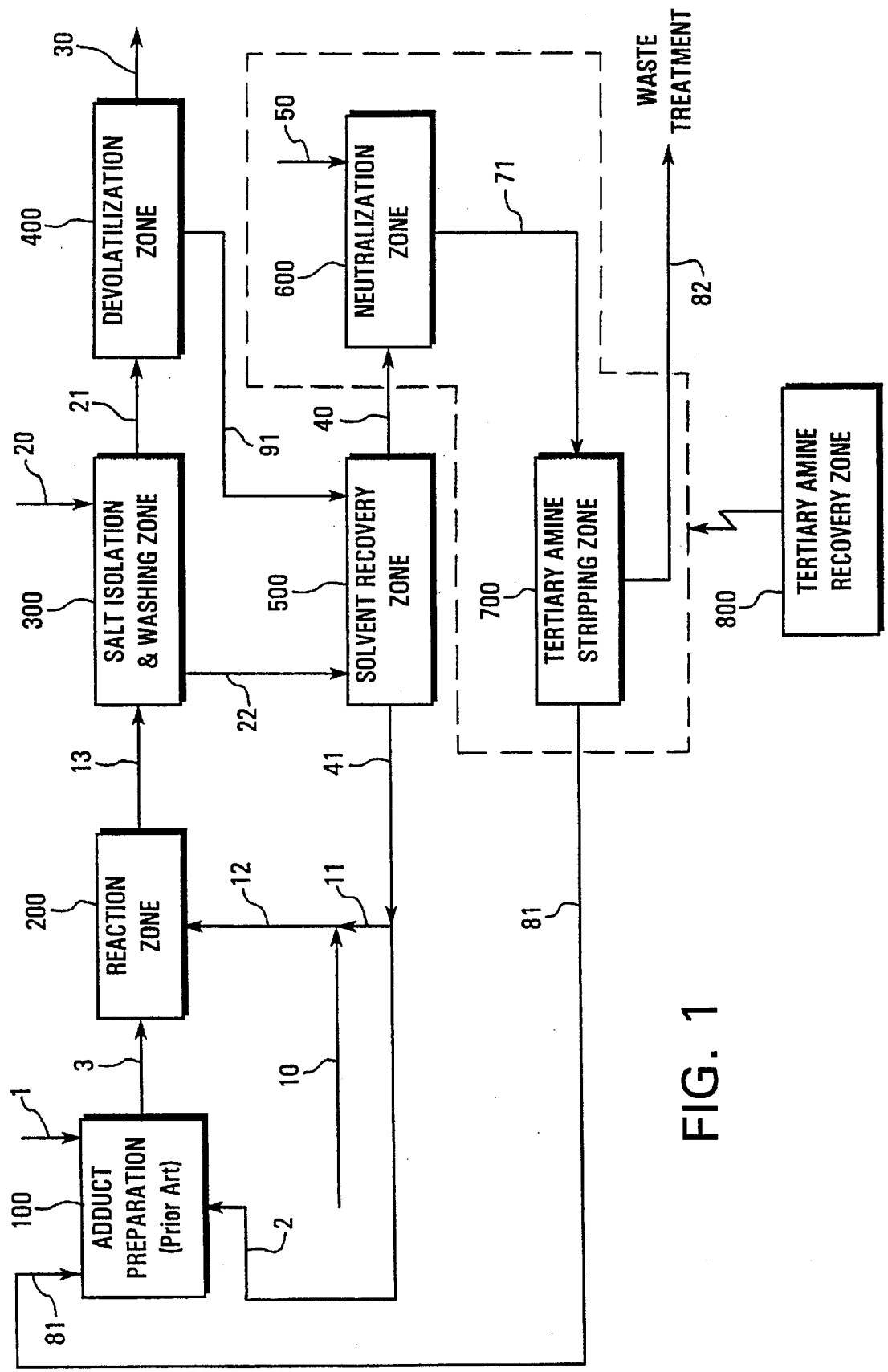
FIG. 1 is a schematic representation of one embodiment of the present invention using a water miscible solvent.
Figure 2:
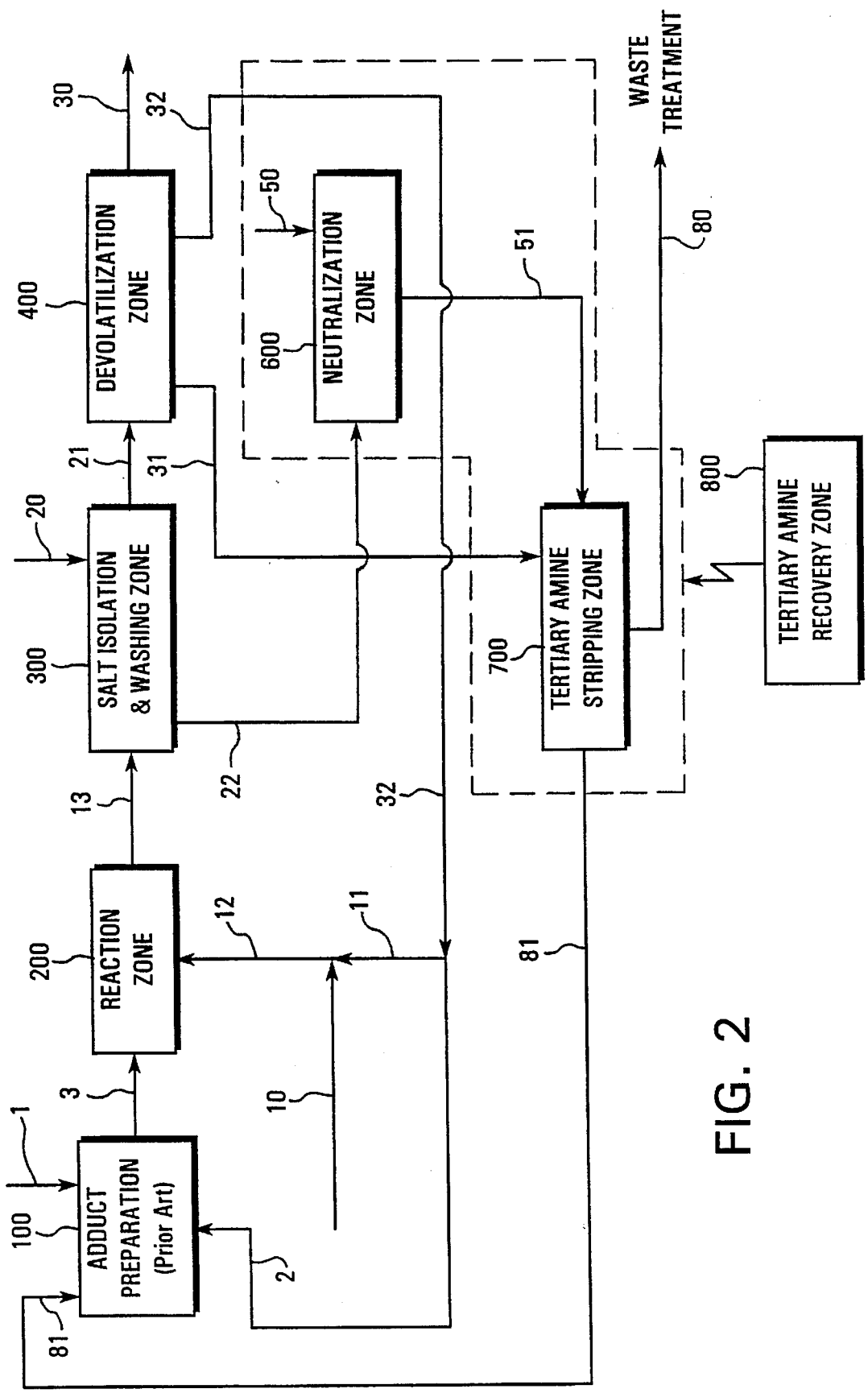
FIG. 2 is a schematic representation of one embodiment of the present invention using a water immiscible solvent.

Both FIG. 1 and FIG. 2 show that a first feed stream 3 comprising an adduct or a tertiary ammonium salt of:

1) a phenol-formaldehyde oligomer or derivative thereof ("oligomers") of the formula:

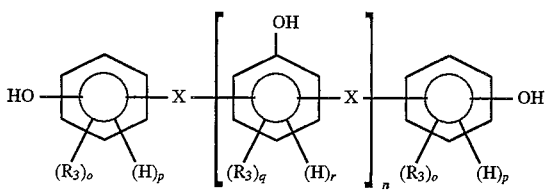

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer; and 2) a tertiary amine in a reaction medium comprising a solvent is fed into a reactor vessel.

A second feed stream 12 comprising a cyanogen halide in a reaction medium comprising a solvent, is also fed into the same reactor vessel in reactor zone 200 to form a reaction mixture. The reaction mixture is reacted under conditions sufficient to form a stream comprising the multicyanate ester along with at least one component selected from the group consisting of solvent, trialkylamine hydrohalide salt, and organics such as diethyl cyanamide, imidocarbonate, alkyl halide, phenyl cyanate, tertiary amine, cyanogen halide, and mixtures thereof, wherein the alkyl halide has from about 1 to 10 carbons.

The types of oligomers which are suitable for use in forming the adduct may vary widely and are those of the Formula 1. The free phenol contained in the oligomer should be minimized since it can react with cyanogen halide during the reaction step of the process to form phenol cyanate, a volatile material which contributes to the formation of smoke and other volatiles during the curing of the ester resin. Preferably, the oligomers contain less than about 5 percent, and more preferably less than about 1 percent of free phenol based on the total weight of the oligomer-free phenol. The amount of free phenol in the oligomer of choice is less than about 0.5 percent based on the total weight of the oligomer.

In an alternative embodiment, the oligomer may be combined with monofunctional aromatic phenolic resins, e.g., nonylphenol, difunctional aromatic phenolic resins such as resorcinol or phenolphthalein, and mixtures thereof in order to reduce the viscosity of the oligomer product.

The molecular weight of the oligomer may vary widely. The preferred number average molecular weight of the oligomer in the range of from about 200 to about 2000, and more preferably from about 250 to about 1500. Novolac resins having a number average molecular weight of from about 280 to about 750 are most preferred. The molecular weight distribution and number average molecular weight can be determined by conventional methods known in the art, such as gel permeation chromatography using tetrahydrofuran ("THF") as a solvent.

In the structure of Formula 1, $R_3$ is an inert substituent. Illustrative of suitable $R_3$ groups are such inert substituents as halogen, trihalomethyl, alkyl, alkoxy, phenyl and the like.

Illustrative of suitable —X— groups are alkylene such as methylene, ethylmethylene, 2-ethylpentylmethylene, methylmethylene, isopropylmethylene, isobutylmethylene, pentylmethylene, and furylmethylene, and the like; arylenes or arylakylenes such as 1,3-benzenedimethylene, phenylmethylene, 1,4-benzenedimethylene, 2,2-bis-(1,4-phenylene)propane, 4-methoxyphenylmethylene, bis-(1,4-phenylene)methane, 4,4-diphenylene dimethylethane; and the cycloalkylenes such as cyclohexylene, cyclooctylene, and the 1,3-cyclohexanedimethylene, and the like.

Preferred oligomers for use in the practice of this invention are those embodiments of the Formula 1 in which:

—X— is —O—, —S—, —SO$_2$—, —C(O)—, —OC(O)—, —C(O)O—, substituted or unsubstituted methylene or 1,4-benzenedimethylene wherein permissible substituents are halogen, alkyl or furyl; q and r are the same and are positive whole numbers from 0 to 3, with the proviso that the sum of q and r is 3; $R_3$ is alkyl; n is a positive number from 1 to about 20; and o and p are the same or different at each occurrence and are positive whole numbers from 0 to 4, with the proviso that the sum of o and p at each occurrence is 4.

Among the preferred embodiments, particularly preferred oligomers are those of above Formula 1 in which:

—X— is —O—, —S—, —SO$_2$—, —C(O)—, —OC(O)—, —C(O)O—, methylene, methylene substituted with alkyl having from about 1 to about 10 carbon atoms, halogen or furfuryl, or 1,4-benzenedimethylene;

$R_3$ is methyl or ethyl;

o is 0 or 1;

p is 0 or 1;

n is 1 to about 12;

q is 0 or 1;

r is 1 to 3; and p is 1 to 4.

The most preferred embodiments oligomers, are those of the Formula 1 in which:

n is 1 to about 8;

q is 0;

o is 0; and

X is a moiety of the formula: —CF$_2$—,

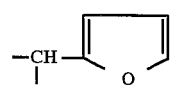

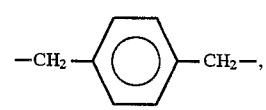

—SO$_2$—, —C(O)—, —OC(O), —C(O)O—, —S—, or —O—, r is 3; and

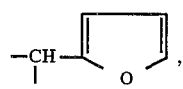

p is 4, with those oligomers in which X is —CF$_2$—, or

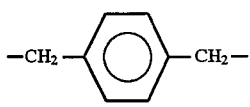

being the oligomer of choice.

Any type of tertiary amine can be used in the process of this invention. Illustrative of useful tertiary amines are trimethylamine, triethylamine, tripropylamine, N,N-dimethylamine, N-methylpiperidene, dimethyl-secbutylamine, N-methylpyrrolidine, pyridine and the like. Preferred tertiary amines are trialkylamines having from about 1 to about 10 carbons, and the most preferred trialkylamine is triethylamine ("TEA").

The tertiary amine is reacted with the oligomer in an amount sufficient to form the desired adduct. In general, the amount of amine reactant is at least equivalent to or substantially equivalent to the amount of the phenolic resin or an excess of the amine reactant is used. An equivalent amount of the amine is an amount which is sufficient to react with all or substantially all of the hydroxy substituents of the oligomer. The upper limit to the amount of amine reactant is not critical and is dependent primarily on economic factors and the difficulty of removing excess amine during purification of the reaction product. In the preferred embodiments of the invention, the amount of amine is such that the ratio of equivalents of oligomer to equivalents of tertiary amine is from about 1:1 to about 1:1.1. Amongst these particularly preferred embodiments, most preferred are those embodiments of the invention in which the amount of amine is such that the ratio of equivalents of oligomer to equivalents of tertiary amine is from about 1:1.005 to about 1:1.1, with an equivalent ratio of about 1:1.05 being the equivalent ratio of choice.

The adduct or tertiary ammonium salt comprising the oligomer and the tertiary amine may be prepared by any means well-known in the art. See, for example, U.S. Pat. Nos. 5,137,989 and 5,124,414, both of which are incorporated by reference herein. As used herein, the adduct or tertiary ammonium salt may be defined in terms of its chemical species, i.e., (oligomer)$_n$ tertiary amine, or in terms of weight of oligomer plus weight of tertiary amine.

Suitable cyanogen halides for use in the practice of this invention include cyanogen chloride and cyanogen bromide, with cyanogen chloride being most preferred.

Suitable solvents for use in the first step of the process of this invention include water miscible solvents, water immiscible solvents; and mixtures thereof. Examples of suitable water miscible solvents include THF, glyme, dioxin, dimethylformamide, acetone, methyl ethyl ketone, and the like and mixtures thereof.

Examples of suitable water immiscible solvents include aliphatic nitriles as for example, acetonitrile, propionitrile, acrylonitrile, butyronitrile, valeronitrile, and the like; nitro substituted aromatic and aliphatic compounds such as nitrobenzenes, nitroethane, nitromethane, 1-nitropropane, 2-nitropropane and the like; halo substituted aromatic and aliphatic compounds such as chlorobenzene, 1,2-dichlorobenzene, chloroform, bromoethane, chloroethane, pentachloroethane, 1,1,2,2-tetrachloroethane, 1,1,2-trichloroethane, bromomethane, dichloromethane, and the like; various sulfides and disulfides such as carbon disulfide and dimethyl sulfide, cyclohexanone, methylene chloride, alkyl acetate having from about 1 to about 10, preferably from about 1 to about 4 carbons, methyl isobutyl ketone, and the like and mixtures thereof. As used herein "water immiscible solvent" shall refer to solvents having less than or equal to about 10 percent solubility in water.

Examples of suitable mixtures of water miscible and water immiscible solvents include toluene and isopropanol, butyl acetate and THF, and methylene chloride and acetone.

Preferred solvents include the above-mentioned solvents having a solubility parameter equal to or greater than about 8.0. In one preferred embodiment, a homogeneous solvent having a solubility parameter greater than about 9.0 and less than about 13 may be used.

Particularly preferred solvents include water miscible solvents such as THF, and bromo and chloro-substituted aliphatic compounds such as methylene chloride, both types of solvents having a solubility parameter approximately equivalent to that of the multicyanate ester resin.

THF is the most preferred solvent, one reason being that it is capable of dissolving both the adduct and the cyanate esters made from high molecular weight oligomers. However, although methylene chloride alone will not dissolve all oligomers having a high molecular weight, the complex formed between methylene chloride and trialkylamine is unexpectedly capable of doing so. See U.S. Pat. No. 5,137,989.

In one embodiment of the process of the present invention, the oligomer and the tertiary amine are introduced into the reactor zone as individual streams. In a preferred embodiment, an adduct of oligomer and tertiary amine is initially formed, then the adduct is fed as one feedstream into the reactor zone. The batch preparation of the oligomer-tertiary amine adduct allows for more stringent control of reaction stoichiometry, the importance of which is illustrated by the fact that the presence of tertiary amine in amounts greater than about only 2 percent molar excess will promote diethylcyanamide formation. In addition, the cyanation reaction rate of cyanogen halide with the adduct is more rapid than the rate of reaction of cyanogen halide with individual streams of phenolic resin and tertiary amine, respectively. Not only does forming the adduct minimize the volume and reaction time during which the reactor must be cooled, and thus the expenditure of energy required to maintain such cooling, but it also reduces the time for which the tertiary amine can react with the cyanogen halide to form the known Von Braun intermediates. These intermediates are more likely to break down into diethyl cyanate and ethyl chloride as opposed to react with the oligomers.

The relative amounts of the reactants may vary widely and will generally depend on the degree of cyanation desired. In general, the higher the desired degree of cyanation, the higher the equivalent ratio of cyanogen halide to adduct, and vice versa. In effecting the reaction of the adduct and the cyanogen halide while minimizing the formation of impurities according to the invention, the molar ratios of tertiary amine to oligomer repeat unit present in the feed stock charged to the reactor zone generally ranges between from about 1.005 to about 1.1, and preferably from about 1.01 to about 1.05, and more preferably from about 1.02 to about 1.04, and the molar ratios of cyanogen halide to oligomer repeat unit present in the feed stock charged to the reactor zone generally ranges between from about 1.02 to about 1.15, and preferably from about 1.05 to about 1.10, and more preferably from about 1.06 to about 1.09. The molar excess of tertiary amine and cyanogen halide should be as low as possible in view of the accuracy of the means for weighing and measuring.

In order to provide adequate dilution of the reactants so as to avoid the formation of concentration gradients in the vessels within the reactor zone, the solvent is preferably divided so that from about 50 to about 100 percent, and more preferably from about 65 to about 70 percent of solvent is used to dissolve the adduct within the adduct-containing feed stock and the remainder is used to dissolve the cyanogen halide within the cyanogen halide-containing feed stock. In a preferred embodiment, the overall amount of solvent charged to the reactor zone is to be such that the final multicyanate ester concentration is, based upon the total weight of the stream exiting the reactor zone exclusive of the weight of any tertiary amine-hydrohalide salt contained therein, about 10 to about 40 percent, preferably about 15 to 20 percent, and more preferably about 20 to 25 percent, in the reaction stream exiting the reactor zone.

In a preferred embodiment, the adduct in solution is charged to the reactor within the reactor zone 200 in a feed stream 3 containing from about 21 to about 51 percent, and preferably about 38 to about 41 percent of adduct. In one embodiment wherein the selected cyanogen halide is cyanogen bromide, the cyanogen halide in solution is charged to the reactor zone 200 in a feed stream 12 containing, based upon the total weight of the feed stream 12, from about 21 to about 51, and preferably about 40 to about 42 percent of cyanogen halide. In an alternative embodiment wherein cyanogen chloride is the cyanogen halide of choice, feed stream 12 contains, based upon the total weight of the feed stream 12, from about 13 to about 100 percent, and preferably about 27 to about 30 percent cyanogen halide. Unless stated otherwise, multiple streams which are introduced into a respective zone may be combined in a conventional mixing means located in the flow stream before the vessels or the pipe volumes functioning as "vessels" contained within the respective zone, or in the alternative, the multiple streams may be independently introduced into and combined within the vessels or pipe volumes. As used throughout, all references to "vessels" shall include conventional vessels as well as pipe volumes functioning as "vessels", i.e., pipe loop reactor. See Levenspiel, Chemical Reaction Engineering, 144–49 (2nd Ed. 1962), which is incorporated herein by reference.

Preferably, multiple streams within the reactor zone 200 are combined in high intensity mixing means, and more preferably within the reactor vessels. In view of the fact that the cyanation reaction occurs almost instantaneously in the presence of the given reactants and solvents and in order to minimize the resulting high temperatures resulting therefrom, multiple streams in the reactor zone 200 are preferably not combined outside of either the reactor vessels and/or pipe volumes without also applying conventional cooling means thereto.

Reactor zone 200 may contain of one or more loop reactor vessels arranged in series, which is advantageous for reactions that are highly exothermic and have fast kinetics, such as the present reaction between the adduct and cyanogen halide. This is because loop reactors combine rapid mixing, within either circulation pumps or high intensity pipe line mixers, with high heat transfer rates in order to minimize heat and concentration gradients within its reactor vessels.

Suitable loop reactors for the process of the present invention have a residence time of from about 10 to about 25 minutes. According to a preferred embodiment, either two loop reactors in series, or a first loop reactor attached in series with a means for providing a residence time of from about 10 minutes to about 25 minutes, such as a pipeline or staged agitated reactor, are used.

The loop reactors may be comprised of an elongated tubular vessel or series of such vessels, and a piping means for recycling a portion of the reaction product stream. In a preferred embodiment of this invention, agitation means to vary the degree of mixing of the reaction mixture can also be employed. Mixing by vibration, shaking, stirring, shearing, rotation, oscillation, ultrasonic vibration or the like are all illustrative of the type of agitation means contemplated. Mechanical shearing devices such as pump impellers or agitator blades, are preferred. Such means are available and well known to those skilled in the art. In a preferred embodiment, the streams 3, 12 are admixed in an agitation means, such as a centrifugal pump, in order to provide intimate mixing before entering the reactor vessel or equivalent piping volume. The centrifugal pump also provides movement of reaction mass through a cooling heat exchanger located within the loop reactors of the reactor zone.

The stream or stream(s) flowing into the initial loop reactor may be agitated to impart a degree of turbulence corresponding to a pipe flow Reynolds number greater than about 5000 employing such agitation means operating at a net horsepower input of at least about 0.0013 kW per liter of reactor (0.007 HP/gallon of reactor (0.005 kW per gallon of reactor)). Agitating the reaction mixture to provide a greater degree of turbulence, i.e., corresponding to a pipe flow Reynolds number of greater than or equal to about 100,000 employing agitation means operating at a net horsepower input of about 0.342 kW/liter of reactor (1.3 HP/gallon of reactor (1 kW per gallon)), while effective, produces no additional advantage. See U.S. Pat. No. 3,338,965, which is incorporated by reference herein.

In a preferred embodiment, the loop reactors of the present invention use circulating pump horsepower energy input of from about 0.01 to about 0.029 kW/liter of reactor (0.05 to about 0.15 HP/gallon (0.037 to about 0.112 kW/gallon)), with a turbulence factor as expressed by Reynolds Number of at least from about 5,000 to about 30,000 in the heat exchanger, and from about 50,000 to about 250,000 in the circulating piping, with a system turnover of at least about 4 to about 10 times per minute. Preferably, the turbulence factor ranges from about 12,000 to about 20,000 in the heat exchanger used to cool the first reactor vessel, and from about 100,000 to about 200,000 for the piping. Preferably, the system turnover ranges from about 4 to about 8 for the first loop reactor, and from about 7 to about 10 for the second loop reactor.

The equipment for use in this invention should be constructed of materials which are inert to the components contained therein, and the fabrication of such equipment should be able to withstand the reaction temperatures and pressure. More specifically, the loop reactor in which the cyanation reaction is conducted, as well as any other pipes and/or vessels containing the multicyanate ester, its purified raw materials and/or solvents are preferably made of corrosion resistant material such as stainless steel; carbon steel coated with cyanate ester resin; glass; plastics such as polytetrafluoroethylene available from DuPont under the tradename "Teflon" and polyphenylene sulfide; and nickel-based alloys such as "Hastalloy", alloys available from International Nickel Corporation under the tradename "Inconel", and the like. Other solutions destined for stripping operations or waste treatment may be contained in pipes and vessels constructed from any of the above-mentioned materials; however, pipes and vessels in both the solvent recovery zone 500 and tertiary amine stripping zone 700 are preferably constructed from nickel-based alloy materials due to the presence of boiling salt water contained therein.

Although the temperature of either the feed stream 3 containing the adduct and/or the feed stream 12 containing the cyanogen halide is not critical, both streams are generally at a temperature ranging between from about −20° C. and about 30° C., preferably about 20° C., and pressures of about 345 kPa to about 690 kPa (about 50 to about 100 psig) upon entering the reactor zone 200. In a preferred embodiment, the reaction product stream exiting the first loop reactor will be at a temperature ranging between about −20° C. to about −5° C., preferably from about −10° C. to about −8° C. as it is charged into the second loop reactor.

The temperature at which the cyanation reaction occurs in the loop reactor is critical and must be equal to or less than about −5° C. in the first loop reactor. After about 98 percent of the reaction is completed, the temperature of the first loop reactor may be raised to from about 5° to about 10° C. until the reaction is completed. The temperature is nearly uniform throughout the loop reactor, i.e., about ±1° C. to about ±3° C. As the temperature within the reaction vessel increases, amount of impurities, such as carbamates, dicyanamides, and cyanogen halides, produced also increases. The temperature at which the first loop reactor employed in the process operates generally is from about −15° C. to about −5° C., preferably from about −11° C. to about −10° C. In a preferred embodiment, the first loop reactor operates at a temperature ranging from about −9.5° C. to about −10.5° C., and the second loop reactor operates at a temperature ranging from about 0° C. to about 10° C., preferably from about 4.8° C. to about 5.2° C.

The temperature of the mixture within the first reaction pipe of the first loop reactor is cooled via external cooling provided by a heat exchanger connected to the first reaction pipe. Any conventional heat exchanger capable of maintaining the temperature of the first mixture within the prescribed range is suitable. A preferable method for cooling the first loop reactor is via a conventional refrigeration device which provides for the continuous flow of a conventional refrigerant at a temperature of from about −50° C. to about −15° C. around the exterior surrounding the first loop reactor heat exchanger and for compression and condensing of the recycled refrigerant. In one embodiment, a central refrigeration source may supply a liquid coolant, such as ethylene glycol or brine. In another preferred embodiment, the refrigeration device also provides low temperature cooling for the condensers used the distillation columns in the devolatilization zone 400.

Reaction pressures in the loop reactors in the reaction zone are not generally critical. However, if gaseous methyl amines are employed, then the pressure must be sufficient so as to maintain the amines in solution. For convenience, the reaction is generally carried out at atmospheric pressure, although pressure drop in the piping employed within the loop reactors may cause some of the reaction mixtures to be at about 138 kPa gage to about 276 kPa gage (about 20 to about 40 psig).

The period of reaction may vary considerably and will depend upon such factors as the degree of agitating, temperature, nature and proportion of reactants and the like. The reaction is carried out for a time sufficient to provide the desired amount of cyanation. The period of reaction, i.e., residence time, will generally range from about 5 to about 30 minutes, preferably from about 15 to about 20 minutes for the first loop reactor, and from about 5 to about 25 minutes, preferably about 10 to about 15 minutes for the second loop reactor.

A portion of the stream exiting the loop reactor is drawn off as a product stream, while the remainder thereof is recycled back into either the adduct feed stream, the cyanogen halide feed stream, or a mixture of both feedstreams located within or without the first reactor vessel. In a preferred embodiment, the recycle stream, along with the cyanogen halide feed stream and the adduct feed stream, are inputted into a mixing device, such as a conventional centrifugal pump, a high shear mechanical mixing device such as a turbine agitator or a static mixer, or both a centrifugal pump with a mechanical mixing device in series, and more preferably a centrifugal pump, which induces the mixing of the recycle stream with the adduct feed stream and the cyanogen halide feed stream. Thus, one function of the pump is to pre-mix and dilute the streams as they are charged to the loop reactors. Another benefit is that the mixing of the two feed streams with the cool recycle stream results in a drop in the overall temperature of the mixture, which not only reduces the possibility of side product formation but which reduces the energy output required to maintain the subsequent loop reactor at a low temperature. Additionally, the pump induces the circulation of the mass in order to prevent concentration gradient formation. In a more preferred embodiment, the recycle stream is input into the center, or "eye" of the circulation pump.

In a preferred embodiment using two loop reactors, a portion of the stream exiting the second loop reactor is drawn off as product, while the remainder is recycled back into either: 1) the first reaction product stream itself; 2) a mixing means located in the flow stream before the first product stream enters the second loop reactor; or 3) the second loop reactor, and preferably into the second loop reactor.

The quantity and quality of reaction product stream that is recycled in the reactor zone 200 may vary considerably and will depend on such factors as the nature and proportion of reactants, the degree of agitating, temperature and the like. Preferably, the portion of the reaction product stream exiting a loop reactor is such that the volume ratio of the recycle stream to the exiting product stream is about 1:100 to about 1:25, more preferably about 1:100.

The reaction product stream may comprise, based upon the total weight of the reaction stream not including the weight of the tertiary amine-hydrohalide salt, from about 10 to 40 percent, preferably from about 15 to about 30 percent of a multicyanate ester, and at least one component selected from the group consisting of: solvent; tertiary amine hydrohalide salt; impurities such as dicyanamides, i.e., diethyl cyanamide; carbonates, i.e., imidocarbonates; cyanogen halides, i.e., cyanogen bromides and cyanogen chlorides; and other organics, i.e., alkyl halides wherein the alkyl group has from about 1 to about 4 carbons and the halides are bromine or chlorine, phenyl cyanate, tertiary amide; and mixtures thereof. One of ordinary skill in the art can readily optimize the conditions of the reaction in order to arrive at a conversion of the multicyanate ester after the first reactor loop of at least about 99%, and after the second reactor loop or other residence time-providing means of about 99.5 to about 99.99 percent.

The second step of the process of this invention comprises the separation of the multicyanate ester from the tertiary amine hydrohalide salt in the salt isolation and washing zone 300. It is believed that small amounts of tertiary amine hydrohalide salt dissolve in the multicyanate ester and must be removed to less than about 1000 parts per million ("ppm"), preferably less than about 500 ppm, in order to maintain good gel times in the ester. This is because the tertiary amine hydrohalide breaks down into a tertiary amine and a halide acid upon heating, and the resulting tertiary amines therefrom disadvantageously are strong catalysts for triazine formation which reduces resin gel times. In addition, the maximum amount of dicyanamides which may be present in stream 13 should be removed at the salt isolation and washing zone 300 in order to minimize the amount to be later removed downstream in the process. Although it is believed that the dicyanamides themselves do not affect gel times of the multicyanate esters, it is believed that they cause the multicyanate ester molecules to become tacky and adhere to one another, which makes later processing difficult.

In one embodiment, the reaction product stream 13 is filtered in the salt isolation zone 300 in order to remove the tertiary amine hydrohalide from the multicyanate ester solution. The filtrate comprising multicyanate ester dissolved in solvent can be removed from the filter cake by conventional means known in the art for the separation of solids from liquids, such as by vacuum filtration or centrifugation. The remaining filter cake contains some multicyanate ester, solvent and soluble impurities. Any multicyanate ester contained within the filter cake may be recovered by well-known means, such as by washing with fresh solvent and refiltering as described in Perry and Chilton, Chemical Engineers' Handbook, 19.77–19.78, 19.80–19.81, and 19.47, (5th Ed. 1973) ("Perry's"), which is incorporated in its entirety herein by reference. The initial filtrate from the reaction mixture and the washing are then combined and discharged from the salt isolation zone by conventional means.

In an alternative embodiment, the reaction stream 13 exiting the reactor zone 200 may be quenched with a water stream 20 in the salt isolation and washing zone 300, more preferably in a conventional mixing device located therein, to produce two phases: one phase comprises the multicyanate ester and dicyanates in solvent, and the other aqueous phase comprises the tertiary amine hydrohalide salt, and at least one of the following components selected from the group consisting of water miscible solvent, water, impurities, organics and mixtures thereof. In an alternative embodiment wherein the solvent is a water immiscible solvent, more preferably methylene chloride, only trace amounts of solvent and dicyanamides appear in the aqueous phase and the separation is relatively straightforward provided that there is a sufficient difference in specific gravity between the multicyanate ester and solvent phase and the aqueous phase in order to allow for phase separation.

After quenching, the resulting stream containing multicyanate ester may be washed, preferably twice, with a water stream. Additional water streams may be provided for each washing step, or preferably, a water stream may be divided into several parts using conventional metering devices such as pumps, flowmeters, and the like, and be used not only to quench stream 13 but also to provide subsequent washes.

"Quenching" as used herein, means the admixing of a sufficient amount of water with the reaction stream 13, in order to dissolve the tertiary hydrohalide salt solids remaining therein as well as to preclude the further reaction of cyanogen halide with the ester. "Washing" as used herein, means the admixing of a sufficient amount of water with the post-quenched stream containing the majority of multicyanate ester.

The ratios of water to solvent must be controlled during quenching in order to maintain the tertiary hydrohalide salt solids in solution and to maintain the proper specific gravity difference between the aqueous salt solution phase and the multicyanate ester solution phase. In a preferred embodiment using a water miscible solvent, more preferably THF, the water stream is mixed with the reaction stream 13 at a weight ratio of reactant slurry to water of about 1 to about 1, more preferably about 4 to about 1. It is believed that this amount of water sufficiently dissolves the hydrohalide salt, giving a concentrated salt water solution which: 1) minimizes the multicyanate esters' solubility in the aqueous salt solution phase; 2) provides a large density difference between the aqueous salt solution phase and the multicyanate ester solution phase which promotes rapid and clean separation; and 3) quenches side reactions of excess tertiary amine and cyanogen halide leading to dicyanamide formation. In addition, the use of a lower ratio of water to multicyanate ester solution: 1) provides a concentrated alkaline halide solution upon subsequent neutralization with a caustic, such as sodium hydroxide, in the Tertiary Amine Recovery Zone 800; and 2) minimizes the tertiary amine/solvent solubility in the aqueous salt water phase, thereby reducing the amount of organic which must be removed from waste water in a stripping column located with the Solvent Recovery Zone 500.

In a preferred embodiment wherein a water miscible solvent is employed, some of the solvent will migrate from stream 13 into the solution of salt in water during quenching, which advantageously increases the concentration of the multicyanate ester, preferably to about 25 percent, in the stream exiting the quench. During subsequent washings of the multicyanate ester-containing stream, the solvent contained therein will migrate into the wash water. As a result, the evaporation load on subsequent ester recovery units in the Devolatilization Zone 400 is reduced.

In the embodiment wherein a water immiscible solvent is employed, the water preferably flows countercurrently to the reaction stream containing multicyanate ester. The volumetric ratio of water to solution containing multicyanate ester generally ranges from about 2:1 to about 0.25:1, preferably from about 0.35:1 to about 0.25:1. One disadvantage associated with using a water immiscible solvent is that the ester solution which exits the countercurrent flow contacting means is not concentrated by subsequent removal of the solvent employed therein because the ester and solvent remain together in one stream and because the solvent is insoluble in water. Thus, the effectiveness of removing dicyanamides from the ester-containing stream is also reduced due to the insolubility of the water immiscible solvent in water.

After the reaction stream from the reactor zone is mixed with quench water, the resulting mixture is then separated by a conventional separator in the salt isolation and washing zone 300. Although temperature is not critical during the quenching and washing steps, it is preferable that the temperatures achieved during those steps does not rise above about 15° C. in order to prevent hydrolysis of the multicyanate ester. Preferably, the temperature may vary rom about 5° C. to about 20° C., more preferably from about 5° C. to about 10° C. The residence time for the mixture in the mixer-separator of zone 300 may vary from about 10 to about 40 minutes, preferably from about 23 to about 26 minutes.

After the quenching and separating, the multicyanate ester solution is then washed with a water stream. In a preferred embodiment of this invention wherein a water miscible solvent is employed, the salt isolation and washing zone 300 contains a plurality of conventional mixer-separators arranged in series, in order to further concentrate the ester and to further remove more dicyanamide and tertiary amine hydrohalide salt remaining in the multicyanate ester-containing stream. In a more preferred embodiment of this invention, from about 3 to about 5 mixer-separators are employed, and most preferably about 3 are employed in order to wash the multicyanate ester solution preferably about 2 to about 4 times, and more preferably about 2 times. Part of the water stream 20 washes the stream containing the multicyanate ester which exits each separator in ester:water ratios of about 1:5 to about a 1:1, and preferably about 1:4, before each respective stream containing the multicyanate ester is introduced into each subsequent mixer separator. Processing with mixer-separators is well known in the art, details of which are described in Perry's, 21-13.

In a preferred embodiment wherein THF is employed as the solvent and the multicyanate ester solution is quenched and then washed with water in about a 4:1 ratio during each quench or application of fresh water wash, about 25 to about 30 percent of dicyanamides may also be extracted from the multicyanate ester solution per quench/wash applied thereto. In a more preferred embodiment, the THF solvent is present in an amount, based upon the total weight of the aqueous layer, solvent-containing phase, from about 20 to about 25 percent after quenching, about 30 to 34 percent after quenching and one wash, and about 38 to 42 percent after quenching and two washes. By employing THF at such concentrations, the extracting capabilities of the aqueous solution is improved over that of the water extractant used alone.

In an alternative embodiment wherein a water immiscible solvent, such as methylene chloride, is employed, means for effecting a countercurrent separation, such as via conventional connected mixer settlers, packed columns, and mechanical contactors such as rotating disk contactors or contactors available from York-Schiebel may be similarly arranged in series and similar amounts of water may be employed for quenching and washing. Processing with such well-known countercurrent separation means described in, for example, Perry's at 21-7, 21-14, 21-19, 21-24, and 21-26.

The quantity and quality of the tertiary amine-hydrohalide salt containing streams 22 which exit each separator/mechanical contactor in the Salt Isolation and Washing Zone 300 may vary depending on the residence times and temperatures within the separator/mechanical contactors. These streams 22 may be combined and/or may be stored in a conventional storage tank for subsequent recovery of the solvent in the embodiment employing a water miscible solvent, or for subsequent neutralization in the embodiment employing a water immiscible solvent.

The quantity and quality of the organic multicyanate ester-containing stream 21 exiting the final separator/contactor in the salt isolation and washing zone 300 also may vary depending on the residence time and temperature within each separator/contactor, as well as on the number of separators/contactors used. Typically, stream 21 contains the multicyanated ester in an amount of, based upon the total weight of stream 21, from at least about 35 percent, preferably at least about 40 percent, and more preferably at least 50 percent; and, based upon the weight of ester in stream 21, from less than about 10000 ppm, preferably less than about 6000 ppm of dicyanamides, from less than about 1000 ppm, preferably less than about 500 ppm of tertiary halides, and less than about 9500 ppm of cyanogen halides. Stream 21 may be introduced into a conventional storage tank for later devolatilization or may be directly introduced in the devolatilization zone 400.

In the third step of the process, the overhead stream 21 from the salt isolation zone 300 is fed into a devolatilization zone 400 comprised of one or more evaporators and one or more devolatilization means for the purpose of removing the remaining solvent from the stream containing the multicyanate ester.

Suitable devolatilization means are well known in the art, and include evaporators having external pumps and heat exchangers, and preferably thin film wiped surface evaporators, such as those obtainable from Luwa Co. For example, such means are described in Perry's at 10-34. Thin film wiped surface evaporators preferably minimize the length of time to which the ester is exposed to high temperatures, and thus minimizes the possibility of its thermal degradation. A single devolatilization means or a plurality of devolatilization means arranged in series may be used. In a preferred embodiment of this invention, from about 1 to about 3, and preferably about 2 devolatilization means are employed in zone 400.

In order to reduce the heat duty on the initial evaporator located within devolatilization zone 400, the output stream 21 from the salt isolation and washing zone 21 is preferably preheated via conventional heat exchanger means to a temperature of from about 75° C. to about 100° C., and preferably about 78° C. to about 82° C., before entering into the initial evaporator.

In a preferred embodiment of this invention, the solvent is removed in two devolatilization stages such as with the use of two devolatilization means arranged in series within the devolatilization zone 400. As the solvent evaporation load in the second evaporator is increased, the amount of dicyanamides in the final multicyanate ester product is decreased. The vaporization duty is preferably split from about 80 to about 95 percent to the first evaporator and from about 20 to about 5 percent to the second evaporator. In a more preferred embodiment, the vaporization duty is split from about 80 to about 85 percent to the first evaporator and from about 20 to about 15 percent to the second evaporator. The vaporization duty is preferably split as such in order to: 1) allow for most of the solvent to be removed at approximately atmospheric pressure or low vacuum pressure, i.e., about 0.5 atm; 2) to allow for condensation of the solvent vapor against cooling water at ambient temperature; and 3) to minimize the occurrence of problems associated with operating under a high vacuum, i.e., leakage of air into the first devolatilization means. Preferably, the vaporization duties are set such that the first devolatilization means discharges a multicyanated ester-containing stream comprising from about 5 to about 20 percent, more preferably from about 15 to about 20 percent solvent, based upon the total weight of the stream exiting the first devolatilization means.

In a preferred embodiment of this invention, the devolatilization zone 400 is designed such that the bottoms stream exiting the first devolatilization means has a concentration, based upon the total weight of the stream exiting the first devolatilization means, of about 15 to about 25 percent, more preferably about 18 to about 20 percent, of solvent in order to allow for the use of lower temperatures in the first devolatilization means while simultaneously reducing the viscosity of the high molecular weight multicyanate ester solution, which may range from about 0.05 Pa.s (50 cp) to about 0.10 Pa.s (100 cp), preferably from about 0.075 Pa.s (75 cp) to about 0.085 Pa.s (85 cp); and, in embodiments using a water immiscible solvent, to reduce the content of dicyanamides in the multicyanate ester-containing final product stream 30 exiting the second devolatilization means. The dicyanamide content in stream 30 is reduced because the solvent present in the second devolatilization means effectively entrains the high-boiling dicyanates therein.

The vaporization temperature within the devolatilization means located within the devolatilization zone 400 generally ranges between from about 100° C. to about 135° C., preferably from about 115° C. to about 120° C. The bottoms temperature generally ranges between from about 100° C. to about 135° C., preferably about 115° C. to about 120° C. The contact time to which the cyanate ester is exposed to such temperatures is from about 1 to about 6 minutes, preferably about 2.5 to about 3 minutes.

The pressure within the second devolatilization means generally ranges from about 533 Pa abs (4 mmHg abs) to about 1066 Pa abs (10 mmHg abs). In a preferred embodiment, the pressure within the first devolatilization means is from about 51 kPa abs (0.5 atm) to about 132 kPa abs (1.3 atm), preferably about 101 kPa abs (1 atm), and the pressure in the second devolatilization means is from about 400 Pa abs (3 mmHg abs) to about 1330 Pa abs (10 mmHg abs), preferably from about 533 Pa abs (4 mmHg abs) to about 667 Pa abs (5 mmHg abs).

As illustrated in FIG. 2, the multicyanate ester is separated from the distillate stream 31 generally comprising solvent, water, and impurities, i.e., dicyanamides and alkyl halides, within the devolatilization zone 400. Preferably, most of the cyanogen halide and water remaining in the input stream 21 will leave with overhead stream 31 of the first evaporator and separate from the multifunctional ester during subsequent evaporations.

In one embodiment, the product stream from the first evaporator in the devolatilization zone 400 may either be fed directly into a second evaporator within the devolatilization zone without intervening storage, or alternatively the product stream may be fed into a storage tank before entering the second evaporator. In the latter embodiment, lines leading to and from the tank are preferably jacketed, covered with electric heaters, or traced with a conventional heating fluid such that the contents within the lines are maintained at temperatures ranging between about 80° C. and about 110° C., preferably about 90° C. to about 95° C., in order to keep the viscosity of the stream low.

In a preferred embodiment, an elevated head storage tank may be located at about 1.5 m to about 4.5 m (about 5 feet to about 15 feet), preferably about 3 m to about 3.7 m (about 10 feet to about 12 feet), above the inlet of the second evaporator in the devolatilization zone 400, and a conventional pumping means, i.e. gear pump, may be positioned near the inlet of the second evaporator. In this embodiment, the pumping means may be controlled such that the material within the tank remains level and the head pressure of liquid above the pumping means would suppress any solvent vaporization in the line leading to the second devolatilization means. In addition, the pumping means or other means for regulating the flow such as a control valve, prevents solutions exiting the first devolatilization means from reaching the low pressure of the second devolatilization means. Without such pumping or regulating means, the solvent within the stream leaving the first evaporator will flash and cool, thereby causing the viscosity of the ester contained therein to increase and thus plug its flow.

In a preferred embodiment using a thin film wiped surface evaporator as the second devolatilization means in the devolatilization zone 400, a conventional gear pump or extractor extruder may be required to evacuate the highly viscous ester having a viscosity within the range of about 200 Pa.s to about 400 Pa.s (200,000–400,000 cp) from the evaporator. Processing with such gear pumps and extractor extruders are known in the art and are described in, for example, Perry's at 6-13 and 8-61, respectively.

In an embodiment employing a multicyanate ester having a medium to high molecular weight, i.e., from about 450 to about 850, preferably from about 500 to about 750, number average molecular weight, the ester contained within the stream exiting the bottom stream 30 of the last devolatilization means in the devolatilization zone 400 may be quickly solidified in any conventional cooling device, preferably a conventional chilled surface device such as a chilled belt or drum cooler having a scraping device, i.e., blade, in order to remove solidified ester as flakes. Processing with such chilled surfaced devices is well known in the art and described at, for example, Perry's at 11-39. These ester flakes may then be ground via conventional means, preferably by cryogenic grinding, in order to put the ester into a suitable powder form. Such grinding processes are well-known in the art and described in, for example, Perry's at 8-54.

In an alternative embodiment employing a multicyanate ester having a lower molecular weight, i.e., less than about 320 to about 420 number average molecular weight, the ester contained within the stream exiting the bottom stream 30 of the devolatilization zone 400 may be cooled to a temperature of about 20° C. to about 30° C. by conventional cooling means such as by shell and tube heat exchangers, and subsequently recovered by filling containers.

In one embodiment wherein a water immiscible solvent, such as methylene chloride is employed as illustrated in FIG. 2, the solvent-containing stream 32 recovered from the first devolatilization means may be recycled for use in adduct preparation and/or in the dilution of the cyanogen halide stream. Thus, the water immiscible solvents may be recovered without need for the solvent recovery zone 500. The solvent recovered from the second devolatilization means is then fed into the tertiary amine stripping zone 700 in order to remove the dicyanamides therein. In the embodiment wherein a water miscible solvent is employed as illustrated in FIG. 1, stream 91 comprising both the solvent-containing stream recovered from the first devolatilization means containing the dicyanamides, is fed into the solvent recovery zone 500.

In the fourth step of the process, which is recommended if a water miscible solvent is used, the water miscible solvent may be recovered in the solvent recovery zone 500. The condensate stream 91 containing water miscible solvent, water, dicyanamides, and cyanogen halide which exits form the devolatilization zone 400 is admixed with stream 22 comprised of the aqueous effluent resulting from the quench and wash steps performed in the salt isolation and washing zone 300. Stream 22 is generally comprised of water, solvent, dissolved tertiary amine hydrohalide salt, dicyanamides, and mixtures thereof. The resulting mixture of streams 22 and 91 is then fed into a multi-tray distillation column within the solvent recovery zone 500, wherein the water miscible solvent is separated from the salt, impurities, and water. Any conventional separators known in the art, such as packed distillation columns, may alternatively be used in place of the multitray distillation column for separating the solvent in the solvent recovery zone 500. Details regarding multitray distillation and packed column separations may be found, for example, in Perry's at 18-5 and 18-19, respectively.

In one embodiment, a stripping column operating at a temperature ranging between about 80° C. to about 115° C., preferably about 100° C. to about 105° C., and a pressure of about 47 kPa abs (350 mmHg) to about 133 kPa abs (1000 mmHg), preferably from about 101 kPa abs (1 atm), wherein the water miscible solvent and water are separated from bottoms stream comprising most of the water, tertiary amine hydrohalide salt and dicyanamides, may be used as the separation means in the solvent recovery zone 500.

In a more preferred embodiment wherein THF is used as the water miscible solvent, the water and THF form an azeotrope upon mixing streams 91 and 22. This azeotropic composition leaves the top of the column as a distillate stream in the solvent recovery zone 500 operating at atmospheric pressure. Although the amount of reflux will vary based on the number of trays within the column, one skilled in the art would be capable of balancing the size of the column and the amount of reflux in order to optimally produce the azeotrope composition in an energy-efficient and cost-effective manner. Reflux streams in amounts of from about 0.4 to about 1, preferably about 0.50 to about 0.65 times the exiting distillate stream are preferred.

In this more preferred embodiment using THF as the water miscible solvent, the mixture of streams 22 and 91 is fed into the top quarter of a distillation column within the solvent recovery zone 500. Although the bubble point temperature within the column may vary upon the pressure selected and the azeotrope composition, it preferably is from about 60° C. to about 65° C. Although the temperature in the bottoms stream may vary depending upon the pressure in the top of the column, the pressure drop between trays, and the increase in the boiling point of the mixture due to the presence of the tertiary amine-hydrohalide salt, the bottoms stream temperature is preferably from about 102° C. to about 105° C. Although operating pressures in the top and bottom of the column may vary depending on the number of trays and the pressure drop/tray, it is preferably about 101 kPa abs in the top of the column, and about 113 kPa abs to about 117 kPa abs (about 850 mmHg to about 880 mmHg) in the bottom of the column. In this distillation column, the water miscible solvent is separated from the bottoms stream 40 comprising impurities, water, and tertiary amine hydrohalide salt. Operating under these conditions eliminates "carry over" of the tertiary amine salt and flushes the dicyanates down the column. As used herein, "carry over" describes the situation wherein the tertiary amine-hydrohalide salt may become entrained on the uppermost trays and thus be insufficiently scrubbed out of the solvent-containing distillate if the feed entered the column well above the top quarter. The bottom section of the column also strips out any traces of water miscible solvent from the aqueous tertiary amine hydrohalide solution. The tertiary amine-hydrohalide salt is neither volatile nor breaks down, but rather remains in aqueous solution as confirmed by the minimal ppm content of tertiary amine and halide in the solvent distillate stream.

In an alternative embodiment, the tertiary amine-hydrohalide salt could be neutralized prior to the removal of the water miscible solvent by the addition of caustic compounds thereto; however, this is undesirable since the remaining separation of tertiary amine from the water miscible solvent is, in some cases, difficult. By contrast, the separation of tertiary amine in the form of non-volatile salt from any water miscible solvent having a boiling point lower than that of water, may readily be accomplished because the amine remains in aqueous solution as discussed above.

The water miscible solvent stream recovered from the separation means in the solvent separation zone 500 generally contains, based upon the total weight of the water miscible solvent stream 41, less than about 0.1 percent water, preferably less than about 0.01 percent water, which maybe separated from the solvent via a second conventional separation means such as by extractive distillation, by conventional azeotropic distillation with n-pentane or other entrained compound, or preferably by drying with pressure distillation at about 690 kPa to about 1380 kPa (about 100 to about 200 psig). Such azeotropic distillation is well-known in the art and described in, for example, Chang, T. et. al., "Development of an Azeotropic Distillation Scheme for Purification of Tetrahydrofuran" 52 Fluid Phase Equilibria 161–68 (1989) and "Recovery of THF" Publication by DuPont Corporation, both of which are incorporated herein by reference. For example, the solvent stream 41 recovered from the separation means in the solvent separation zone 500 may be fed into a second separation means, such as a second distillation column having a condenser temperature of about 160° C. to about 166° C., a condenser pressure of about 690 kPa to about 1380 kPa (about 100 psig to about 200 psig) and preferably about 1380 kPa (200 psig).

In a preferred embodiment, dry water miscible solvent is removed from the bottoms stream of a second distillation column in the solvent recovery zone 500. The water plus water miscible solvent azeotrope exits the distillate stream of the second distillation column operating under high pressure in the solvent recovery zone 500 as a result of the shifting of the azeotropic composition to a higher water content by raising the pressure and concomitantly the temperature, and then is fed back into the first column of zone 500. The water miscible solvent may then be cooled by conventional means and recycled in stream 41 for use in preparing the adduct solution 2 and/or the cyanogen halide solution 11.

As previously mentioned, the embodiment employing a water immiscible solvent as illustrated in FIG. 2, the solvent recovery zone 500 preferably is omitted. The tertiary amine-hydrohalide salt-containing streams 22 from the salt isolation and washing zone 300 are preferably then combined with a caustic stream 50 comprised of a solution having a concentration of about 25 to about 50 percent alkaline base, such as sodium hydroxide or potassium hydroxide in either solid or solution form, in a conventional container, such as a stirred vessel, a pipe with line mixer, and the like, located within the neutralization zone 600 under conditions sufficient in order to form a solution stream 51 having an organic liquid layer comprising primarily tertiary amine and a trace amount of a water immiscible solvent, as well as a water layer comprising primarily water and sodium halide. Preferably, the temperature of stream 50 is from about 25° C. to about 60° C., and the temperature and pressure within the container are from about 50° C. to about 80° C. and about 1 atm, respectively.

The two-phase stream 51 exiting the neutralization zone 600 as well as the dicyanamide-containing overhead stream 31 from the second devolatilization means are then fed into the tertiary amine stripping zone 700, which is comprised of a plurality of, preferably about 2, separators, such as a distillation column, packed-plate column, slit-plate column, mixtures thereof and the like, operating under conditions sufficient to initially distill the water immiscible solvent, the tertiary amine, and about 11 percent water in an overhead stream from the aqueous salt water stream, i.e., alkaline halide water stream, which is sent to waste treatment. Preferably, streams 31 and 51 are fed into a tray located in the top quarter of the first separator of zone 700 operating at a reflux ratio of about 0.5 to about 1.0, preferably about 0.6 to about 0.7. Although the temperature and pressure within the separators of zone 700 may vary, the temperature therein is preferably about 76° C. and the pressure is from about 40 kPa to about 101 kPa, and preferably about 1 atm (about 300 to about 760 mmHg, preferably about 760 mmHg). The purpose of this initial separator in zone 700 is to remove all but traces of water immiscible solvent and tertiary amine from the aqueous salt water stream 600.

In a preferred embodiment, the overhead stream from the first separator in zone 700 may then be admixed with the distillate stream from a heteroazeotropic distillation column also located within the zone 700. Separation processing via heteroazeotropic distillation is well-known in the art and described in, for example, Perry's at 13-27-13-39. Using heteroazeotropic distillation, the overhead streams from both columns in zone 700 are co-condensed, then phase separated in a conventional separator tank. The water phase is fed back to the first separator in zone 700, while the tertiary amine phase is recycled back to the second azeotropic distillation column of the zone 700. The water immiscible solvent/tertiary amine bottoms stream 61 exiting the bottoms of the second distillation column in zone 700 may be recycled for use in the preparation of the adduct.

As illustrated in FIG. 1, after the water miscible solvent is recovered in solvent recovery zone 500, stream 40 containing impurities, water, anal tertiary amine hydrohalide salt which exits therefrom is then preferably cooled to a temperature ranging between about 20° C. and about 50° C., preferably about 50° C., by a conventional cooling device, such as a heat exchanger, filtered to remove any multicyanate ester particles, then neutralized with the aforementioned caustic or basic solution 50 in the neutralization stage 600 of the tertiary amine recovery zone 800. Upon neutralization of stream 40 with the above-mentioned alkaline base solution, a neutralization mixture 71 comprising a salt, i.e., KCl or NaCl, free tertiary amine, and water is formed. The remainder of the process of the present invention in the tertiary amine recovery zone 800 is essentially equivalent to that described above with respect to the use of a water immiscible solvent, but with one exception: As illustrated in FIG. 1, stream 91 containing the water miscible solvent and dicyanamides is initially fed into the solvent recovery zone rather than the tertiary amine stripping zone 700.

Although the aforementioned description of the process embodiments as illustrated in FIGS. 1 and 2 includes a water miscible solvent and water immiscible solvent, respectively, it is to be understood that those solvents are preferred for those embodiments, respectively, and that any solvent named herein could be used in either embodiment.

We claim:

1. A process for producing multicyanate esters comprising
    a) feeding to a reaction vessel a first feed stream comprising a reaction medium comprising a solvent, an adduct of a tertiary amine and a phenol-formaldehyde oligomer or derivative thereof of the formula:

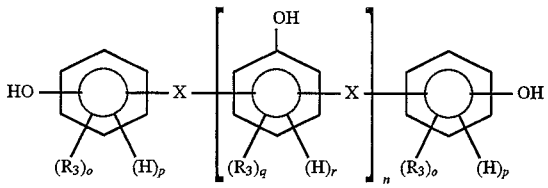

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer;

b) feeding to said reaction vessel a second feedstream comprising a cyanogen halide in a reaction medium comprising a solvent;

c) feeding to said reaction vessel a recycle stream comprising at least one of the following compounds selected from the group consisting of tertiary amine-hydrohalide salt, solvent, impurities, multicyanate ester and mixtures thereof;

d) reacting said first, second, and recycle streams in said reaction vessel under conditions sufficient to form a reaction product stream comprising at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester; and e) removing a portion of said reaction product stream to produce said recycle stream such that the volume ratio of said recycle stream to said product stream is about 100:1 to about 25:1.

2. The process of claim 1 wherein said oligomer has a number average molecular weight of from about 300 to about 2000.

3. The process of claim 1 wherein said oligomer is a novolac resin and:

n is about 1 to about 8;

q is 0;

o is 0; and

X is a moiety of the formula —CF$_2$—,

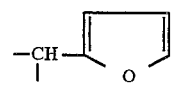

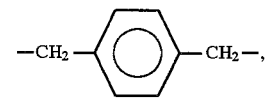

—SO$_2$—, —C(O)—, —OC(O)—, C(O)O—, —S—, or —O—, r is 3; and p is 4.

4. The process of claim 1 wherein said tertiary amine is a triethylamine.

5. The process of claim 1 wherein the weight ratio of oligomer to tertiary amine is from about 1:1 to about 1:1.20.

6. The process of claim 1 wherein said cyanogen halide is cyanogen bromide or cyanogen chloride.

7. The process of claim 1 wherein said solvent is selected from the group consisting of a water miscible solvent, water immiscible solvent and mixtures thereof.

8. The process of claim 1 wherein said solvent is tetrahydrofuran or methylene chloride.

9. The process of claim 1 wherein the molar ratio of cyanogen halide to oligomer repeat unit in said oligomer is from about 1.02 to about 1.15.

10. The process of claim 1 wherein said reaction vessel is comprised of two loop reactors each having a residence time of from about 10 to about 25 minutes.

11. The process of claim 1 wherein the temperature in said reaction vessel is less than about −5° C.

12. A process for the extraction and recovery of water miscible solvents from a mixed aqueous feed stock comprising at least one of the components selected from the group consisting of tertiary amine hydrohalide salt, water, and impurities including diethylcyanamide, cyanogen halide, and alkyl halide, comprising:

introducing said mixed aqueous feed stock into the top quarter of a distillation column operating at conditions sufficient to produce an overhead product stream comprising, based upon the total weight of said overhead product stream, at least about 95 weight percent of tertiary amine which is substantially free of tertiary amine hydrohalide salt and impurities.

13. A process for the extraction and recovery of tertiary amine from a mixed aqueous feed stock comprising at least one of the components selected from the group consisting of tertiary amine, solvent, alkaline halide, water, impurities further comprising diethylcyanamide, cyanogen halide, and alkyl halide, and mixtures thereof comprising:

introducing said mixed aqueous feed stock into the top quarter of a distillation column operating at conditions sufficient to produce an overhead product stream comprising, based upon the total weight of said overhead product stream, at least about 95 weight percent of tertiary amine which is substantially free of tertiary amine hydrohalide salt and impurities.

14. A process for producing multicyanate esters comprising:

a) feeding to a reaction vessel a first feed stream comprising a reaction medium comprising a solvent and an adduct of a tertiary amine and a phenol-formaldehyde oligomer or derivative thereof of the formula:

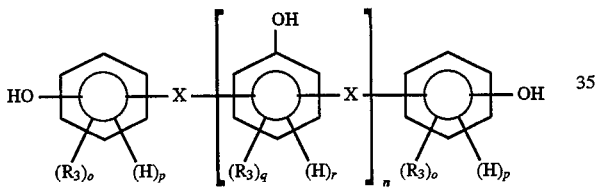

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer;

b) feeding to said reaction vessel a second feedstream comprising a cyanogen halide in a reaction medium comprising a solvent;

c) feeding to said reaction vessel a recycle stream comprising at least one of the following compounds selected from the group consisting of tertiary amine-hydrohalide salt, solvent, impurities, multicyanate ester and mixtures thereof;

d) reacting said first, second, and recycle streams in said reaction vessel under conditions sufficient to form a reaction product stream comprising at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester;

e) removing a portion of said reaction product stream to produce said recycle stream such that the volume ratio of said recycle stream to said product stream is about 1:100 to about 1:25;

f) introducing said reaction product stream to a salt isolation and washing zone to separate said reaction product stream into an organic stream and an aqueous stream, said organic stream comprising said multicyanate ester and at least one of the following components selected from the group consisting of water, solvent, impurities, and mixtures thereof, and said aqueous stream comprising said tertiary amine hydrohalide salt and at least one of the following components selected from the group consisting of water, solvent, impurities, and mixtures thereof;

g) introducing said organic stream into a devolatilization zone to separate said organic stream into a multicyanate ester stream and a devolatilization zone solvent stream;

h) introducing said devolatilization zone solvent stream and said aqueous stream from said salt isolation and washing zone into a solvent recovery zone to form a solvent recovery zone mixture;

i) in said solvent recovery zone, separating said solvent recovery zone mixture into a solvent recovery zone overhead solvent stream and a solvent recovery zone bottoms stream comprising at least one of the components selected from the group consisting of tertiary amine hydrohalide salt, water, dicyanamide, cyanogen halide, and other organics;

j) introducing said solvent recovery zone bottoms stream and a basic solution stream into a tertiary amine recovery zone mixture; and k) in said tertiary amine recovery zone, separating said tertiary amine from said tertiary amine recovery zone mixture.

15. The process of claim 14 wherein said solvent is a water miscible solvent or mixture of water miscible and water immiscible solvent, said mixture having a solubility greater than about 10 percent in water.

16. The process of claim 14 wherein said devolatilization zone is comprised of:

a) a first and second devolatilization means arranged in series; and b) a regulating means between said first and second devolatilization means, whereby said regulating means prevents flashing of said solvent in said first devolatilization means.

17. A multicyanate ester produced according to the process of claim 14.

18. A process for producing multicyanate esters comprising:

a) feeding to a reaction vessel a first feed stream comprising a reaction medium comprising a solvent and an adduct of a tertiary amine and a phenol-formaldehyde oligomer or derivative thereof of the formula:

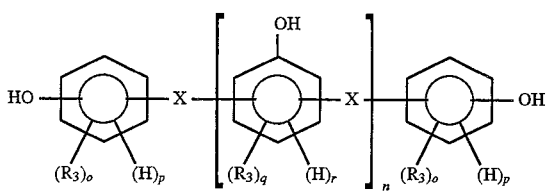

wherein:

n is a positive whole number equal to or greater than 1;

q and r are the same or different at each occurrence and are whole numbers from 0 to 3, with the proviso that the sum of q and r at each occurrence is equal to 3;

o and p are the same or different at each occurrence and are whole numbers from 0 to 4, with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer;

b) feeding to said reaction vessel a second feedstream comprising a cyanogen halide in a reaction medium comprising a solvent;

c) feeding to said reaction vessel a recycle stream comprising at least one of the following compounds selected from the group consisting of tertiary amine-hydrohalide salt, solvent, impurities, multicyanate ester and mixtures thereof;

d) reacting said first, second, and recycle streams in said reaction vessel under conditions sufficient to form a reaction product stream comprising at least one of the following compounds selected from the group consisting of tertiary amine-hydrohalide salt, solvent, and impurities, and, based upon the total weight of the reaction product stream excluding the weight of said tertiary amine-hydrohalide salt, from about 10 percent to about 40 percent of a multicyanate ester;

e) removing a portion of said reaction product stream to produce said recycle stream such that the volume ratio of said recycle stream to said product stream is about 1:100 to about 1:25;

f) introducing said reaction product stream to a salt isolation and washing zone to separate said reaction product stream into an organic stream and an aqueous stream, said organic stream comprising said multicyanate ester and at least one of the following components selected from the group consisting of water, solvent, impurities, and mixtures thereof, and said aqueous stream comprising said tertiary amine hydrohalide salt and at least one of the following components selected from the group consisting of water, solvent, impurities, and mixtures thereof;

g) introducing said organic stream into a devolatilization zone to separate said organic stream into a multicyanate ester stream and a devolatilization zone solvent stream;

h) introducing said devolatilization zone solvent stream and said aqueous stream from said salt isolation and washing zone into a solvent recovery zone to form a solvent recovery zone mixture; and i) in said tertiary amine recovery zone, separating said tertiary amine from said tertiary amine recovery zone mixture.

19. The process of claim 18 wherein said solvent is a water immiscible solvent or a mixture of water immiscible solvent and a water miscible solvent, said mixture having a solubility less than or equal to about 10 in water.

20. A multicyanate produced according to the process of claim 18.

* * * * *